United States Patent Office 2,882,104
Patented Apr. 14, 1959

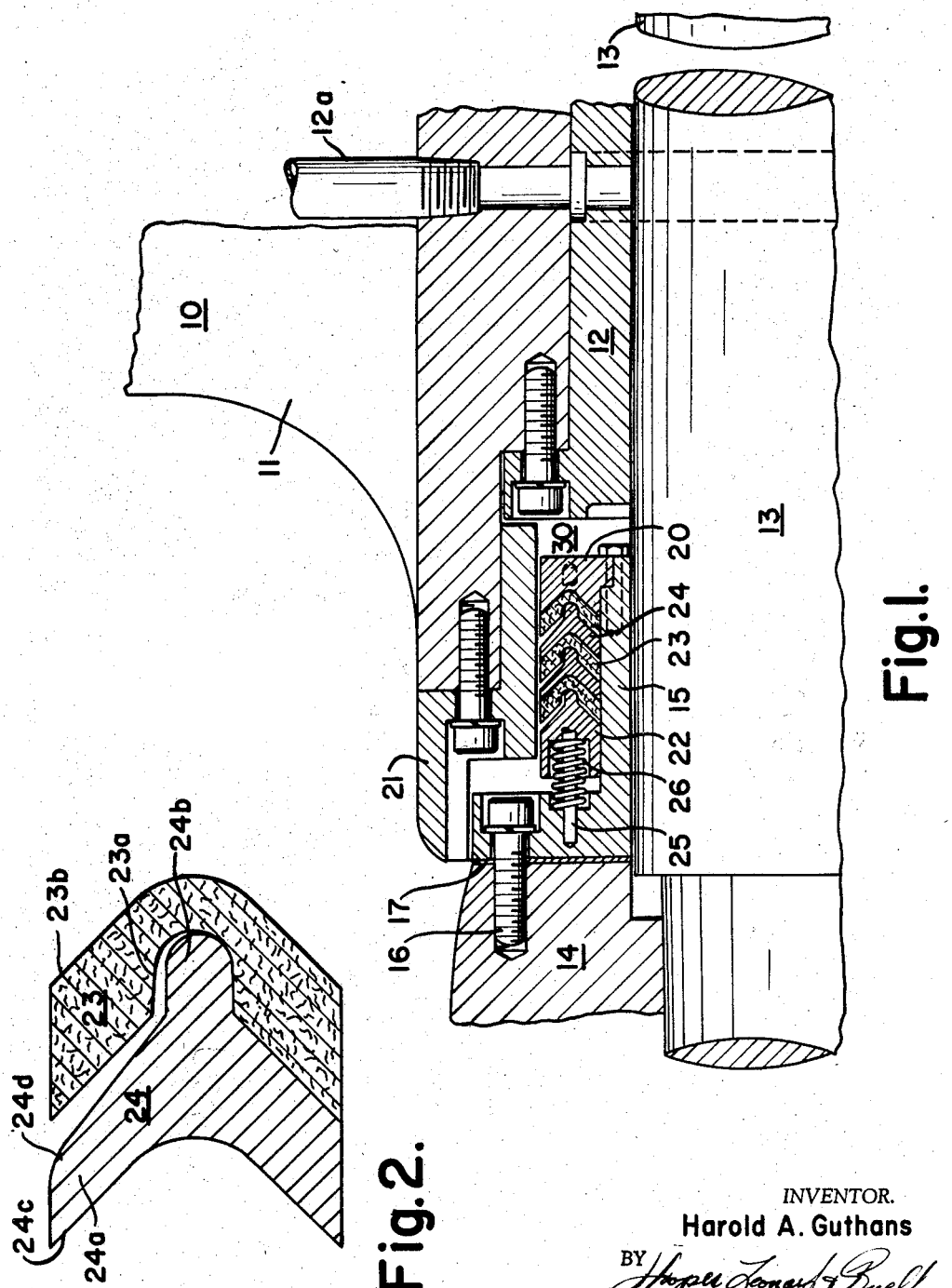

2,882,104

STERN BEARING PACKING GLANDS

Harold A. Guthans, Mobile, Ala.

Application August 17, 1956, Serial No. 604,837

8 Claims. (Cl. 308—36.2)

This invention relates to stern bearing packing glands and particularly to a novel stern bearing packing gland capable of permitting continual lubrication of the gland and stern bearing while excluding the entrance of water through the gland into the bearing. The stern bearing of a water-going vessel performs a very vital function under extremely difficult conditions. The water in which such vessels operate is frequently corrosive such as sea water, or contaminated with sand and similar abrasive particles which tend to attack and destroy the stern bearing. The problem of excluding such water from the bearing has been one of continual interest to builders and operators of water-going vessels. The difficulties encountered in excluding sea water particularly from stern bearings of seagoing vessels has resulted in the use of lignum vitae bearings, micarta bearings and rubber bearings. The problem of providing a satisfactory friction-free bearing material has been a serious one because of the difficulties of excluding sea water or water and sand from the bearings. Many attempts have been made to provide a satisfactory stern bearing seal so that friction-free lubricated bearings might be utilized. In most instances the seal has broken down and failed to protect the shaft from corrosion and wear resulting in galling and destruction of the bearing with costly repairs and loss of time.

The present invention provides a stern bearing gland which overcomes these difficulties and successfully seals the stern bearing against the intrusion of water from the exterior of the vessel. In a preferred embodiment of my invention I provide an annular sleeve surrounding the propeller shaft externally of the stern bearing. This sleeve is adapted to be fixed to the propeller and to rotate with the propeller shaft. Alternate rings of packing material and spacers surround the inner sleeve, each spacer member being arranged so as to have an area adjacent the outer extremity of lesser thickness than the body of the spacer so as to permit the outer periphery of the packing member to move in the axial direction. Preferably the packing members and spacer members are chevron-shaped. Spring means are provided on the inner sleeve urging the spacing members and packing members together. An outer sleeve is fixed to the strut of the boat and surrounds the packing members and spacing members in sealing contact with the packing members. Guide rods are provided on the inner sleeve passing through the spacing members and packing members retaining the spacing members and packing members in position on the inner sleeve so as to prevent rotation with respect to the inner sleeve.

While certain features of a preferred embodiment of my invention have been described hereinabove, other features, advantages and objects of this invention will be apparent from a consideration of the following description and the accompanying drawings in which Figure 1 is a section through a stern bearing and propeller shaft assembly of a seagoing vessel showing the packing gland of my invention.

Figure 2 is an enlarged section of a packing member and spacing member according to Figure 1.

A seagoing vessel 10 having a strut portion 11 is provided with a bronze stern bushing 12 fitted into the strut at the propeller opening. The propeller shaft 13 passes through the bushing 12 and extends outwardly from the strut to carry the propeller 14. An inner sleeve 15 is bolted on to the propeller 14 by means of stainless steel bolts 16. Preferably, the joint between the inner sleeve and propeller is closed by a gasket 17. The inner sleeve 15 surrounds the propeller shaft 13 and is in intimate contact therewith. The sleeve 15 being bolted to the propeller does not slide on the propeller shaft 13 but moves with it. An annular ring 20 is bolted to the inside edge of the inner sleeve 15 and extends radially outwardly therefrom to form a recessed portion extending to the propeller. An outer housing 21 fixed to the strut 11 of the vessel surrounds the inner sleeve 15 and ring 20. A back-up ring 22 surrounds the inner sleeve and is axially movable thereon, between the inner sleeve 15 and the outer housing 21. Between the back-up or follower ring 22 and the annular ring 20 there are provided annular chevron-type packing members 23 spaced apart by spacer members 24, preferably of brass, which have their outermost peripheral edge 24a feathered away to form a portion of reduced cross-section. This is accomplished by forming the two faces 24c and 24d at angles of about 45° and 40° to the axis respectively. This permits the outer periphery of the packing member to bend and move downwardly away from the outer sleeve 21 toward the propeller but restricts the movement of the packing member in the opposite direction. Stainless steel guide rods 25 extend between the inner sleeve 15 and the annular ring 20 through the back-up member 22, the packing members 23 and the spacer members 24 so as to hold the packing members and spacer members against rotation with respect to the inner sleeve and the propeller shaft. Springs 26 are provided on the guide rods 25 urging the back-up member 22 against the packing member and spacer members so as to keep them under continual pressure.

As shown in Figure 2 the chevron-shaped spacing member is preferably formed with its outermost leg 24a having a gradual taper on the top surface, preferably of about 5° and an axially projecting flange 24b at its apex. The packing member is formed with a hollow central portion 23a surrounding the flange 24b of the spacer member so that its outer leg 23b is free to move from the apex thereof toward and away from the propeller shaft.

The operation of the bearing gland is as follows:

Grease is applied continually to the bushing 12 under pressure through inlet 12a and extrudes through the bearing into the area 30 between the bearing and the inner sleeve 15. Being under continual pressure, the grease gradually passes between the packing members 23 and the outer sleeve or housing 21 in the form of a thin cylinder. The packing members 23 are free to move so as to permit the grease to continually pass axially outwardly parallel to the propeller shaft. This continual movement of grease practically eliminates wear between the packing rings 23 and the sleeve 21 and eliminates the entrance of grit and corrosive waters into the gland. Moreover, lubrication is constant and automatic. If, for any reason, there is a failure in the grease pressure or the pressure of the water becomes greater than the pressure of the grease so that water enters between the outer sleeve and the back-up member, it engages the edge of the packing member and forces the packing member into tight engagement with the outer sleeve thereby sealing the sleeve against entry of water. The spring means permits the packing to grow under the action of water and grease as is its custom. By using the bearing gland seal of this invention it is possible to use a conventional metal lubricating stern bearing and get the high efficiency which such bearings are capable of providing. It is hereby possible to eliminate the need for micarta or rubber bearings and the attendant difficulties which have characterized them.

While I have illustrated and described a preferred embodiment of my invention it will be understood that it may be otherwise embodied within the scope of the following claims.

I claim:

1. A bearing gland for propeller shafts and the like subject to external pressure, comprising a hollow cylindrical outer housing extending from a bearing surrounding a propeller shaft and spaced therefrom, a sleeve on the propeller shaft rotatable within said cylindrical housing, a well in said sleeve in the outer periphery thereof, alternate annular rings of packing material and spacers in said well, said spacers and packing material extending between the bottom of the well and the interior of the outer housing, said spacers and packing material having a portion in contact with the outer housing lying at an angle to the axis of the propeller shaft and directed away from the bearing, said spacers being arranged adjacent their outer periphery to permit movement of the peripheral edge of the packing members away from the outer housing under axial pressure from the direction of the bearing and toward and into sealing engagement with the outer housing under axial pressure from the external source of pressure and resilient means urging the packing members and spacer members together.

2. A bearing gland for propeller shafts and the like subject to external pressure, comprising a cylindrical outer housing extending axially from a bearing on a propeller shaft, said housing surrounding and spaced from said shaft, a sleeve fixed to the shaft and rotatable therewith within said housing, shoulder means on each end of the sleeve forming a well therewith, the shoulder adjacent the bearing being in sliding contact with the interior of the outer housing, alternate annular rings of packing material and spacers in said well, said spacers and packing material having a portion in contact with the interior of the housing lying at an angle to the axis of the propeller shaft and directed away from the bearing, said spacers being arranged at their outer periphery to permit movement of the peripheral edge of the packing members away from the bearing under pressure from the bearing and toward the bearing and into engagement with the internal periphery of the housing under pressure from the external source and resilient means acting on the packing members and the spacing members to urge them together.

3. A bearing gland for propeller shafts and the like subject to external pressure, comprising a cylindrical outer housing extending axially from a bearing on a propeller shaft, said housing being spaced from said shaft, a sleeve fixed to the shaft and rotatable therewith within said housing, a radially outwardly extending shoulder on said sleeve adjacent the end remote from the bearing, a removable radial shoulder at the end of the sleeve adjacent the bearing, said removable shoulder adjacent the bearing being in sliding contact with the interior of the outer housing and forming with the fixed shoulder a well on the sleeve, alternate annular rings of packing material and spacers in said well, said spacers and packing material having a portion in contact with the interior of the housing lying at an angle to the axis of the propeller shaft and directed away from the bearing, said spacers being arranged at their outer periphery to permit movement of the peripheral edge of the packing members away from the bearing under pressure from the bearing and toward the bearing and into engagement with the internal periphery of the housing under pressure from the external source and resilient means acting on the packing members and the spacing members to urge them together.

4. A bearing gland for propeller shafts and the like under external pressure, comprising a cylindrical outer housing extending axially from a bearing on a propeller shaft, said housing being spaced from said shaft, a sleeve fixed to the shaft and rotatable therewith within said housing, shoulder means on each end of the sleeve forming a well therewith, the shoulder adjacent the bearing being in sliding contact with the interior of the outer housing, alternate annular rings of packing material and spacers in said well, said spacers and packing material having chevron shape with the portion in contact with the interior of the housing lying at an angle to the axis of the propeller shaft and directed away from the bearing, said spacers being arranged at their outer periphery to permit movement of the peripheral edge of the packing members away from the bearing under pressure from the bearing and toward the bearing and into engagement with the internal periphery of the housing under pressure from the external source and resilient means acting on the packing members and the spacing members to urge them together.

5. A bearing gland for propeller shafts and the like subject to external pressure, comprising a hollow cylindrical outer housing extending from a bearing surrounding a propeller shaft and spaced therefrom, a sleeve on the propeller shaft rotatable within said cylindrical housing shoulder means on each end of the sleeve forming a well in said sleeve, alternate annular rings of chevron-shaped packing material and spacers in said well, said spacers and packing material extending between the bottom of the well and the interior of the outer housing, said spacers having their outer periphery beveled to permit movement of the peripheral edge of the packing members away from the outer housing under axial pressure from the direction of the bearing and toward and into sealing engagement with the outer housing under axial pressure from the external source of pressure and resilient means urging the packing members and spacer members together.

6. A bearing gland for propeller shafts and the like subject to external pressure, comprising a hollow cylindrical outer housing extending from a bearing surrounding a propeller shaft and spaced therefrom, a sleeve on the propeller shaft rotatable within said cylindrical housing, a shoulder means on each end of the sleeve forming a well in said sleeve, alternate annular rings of chevron shaped packing material and spacers in said well, said spacers and packing material extending between the bottom of the well and the interior of the outer housing, said spacers and packing material having a portion in contact with the outer housing lying at an angle to the axis of the propeller shaft and directed away from the bearing, said spacers having a portion adjacent their outer periphery gradually reduced in thickness to form a feathered edge to permit movement of the peripheral edge of the packing members away from the outer housing under axial pressure from the direction of the bearing and toward and into sealing engagement with the outer housing under axial pressure from the external source of pressure and resilient means urging the packing members and spacer members together.

7. A bearing gland for propeller shafts and the like subject to external pressure, comprising a hollow cylindrical outer housing extending from a bearing surrounding a propeller shaft and spaced therefrom, a sleeve on the propeller shaft rotatable within said cylindrical housing, a shoulder means on each end of the sleeve forming a well in said sleeve, alternate annular rings of chevron shaped packing material and spacers in said well, said spacers and packing material extending between the bottom of the well and the interior of the outer housing, said spacers and packing material having a portion in contact with the outer housing lying at an angle to the axis of the propeller shaft and directed away from the bearing, the outer faces of said spacers converging at an angle of about 5° toward the periphery to permit movement of the peripheral edge of the packing members away from the outer housing under axial pressure from the direction of the bearing and toward and into sealing engagement with the outer housing under axial pressure from the external source of pressure and resilient means urging the packing members and spacer members together.

8. A bearing gland for propeller shafts and the like subject to external pressure, comprising a hollow cylindrical outer housing extending from a bearing surrounding a propeller shaft and spaced therefrom, a sleeve on the propeller shaft rotatable within said cylindrical housing, a shoulder means on each end of the sleeve forming a well in said sleeve, alternate annular rings of chevron shaped packing material and spacers in said well, said spacers and packing material extending between the bottom of the well and the interior of the outer housing, said spacers and packing material having a portion in contact with the outer housing lying at an angle to the axis of the propeller shaft and directed away from the bearing, said spacers having a portion adjacent their outer periphery gradually reduced in thickness to form a feathered edge to permit movement of the peripheral edge of the packing members away from the outer housing under axial pressure from the direction of the bearing and toward and into sealing engagement with the outer housing under axial pressure from the external source of pressure, guide rods between the two shoulder means on which the packing members and spacer members ride and resilient means urging the packing members and spacer members together.

References Cited in the file of this patent

UNITED STATES PATENTS 1,399,421     Cedervall _____ Dec. 6, 1921